(12) United States Patent
Van Rees et al.

(10) Patent No.: US 6,707,414 B2
(45) Date of Patent: Mar. 16, 2004

(54) DOCKING INFORMATION SYSTEM FOR BOATS

(75) Inventors: H. Barteld Van Rees, Needham, MA (US); Michael Joseph Delcheccolo, Westford, MA (US); Delbert Lippert, Cobden (CA); Mark E. Russell, Westford, MA (US); Walter Gordon Woodington, Lincoln, MA (US)

(73) Assignee: Raytheon Company, Waltham, MA (US)

( * ) Notice: Subject to any disclaimer, the term of this patent is extended or adjusted under 35 U.S.C. 154(b) by 39 days.

(21) Appl. No.: 10/054,527

(22) Filed: Jan. 22, 2002

(65) Prior Publication Data

US 2003/0137443 A1 Jul. 24, 2003

(51) Int. Cl.[7] ............................................... G01S 13/93
(52) U.S. Cl. ........................................... 342/23; 341/41
(58) Field of Search ................................... 342/23, 41

(56) References Cited

U.S. PATENT DOCUMENTS

| | | | |
|---|---|---|---|
| 3,594,716 A | 7/1971 | Waterman | 340/3 D |
| 3,690,767 A | 9/1972 | Missio et al. | |
| 3,707,717 A | 12/1972 | Frielinghaus | 343/6 R |
| 3,754,247 A | 8/1973 | Hansford | 343/5 R |
| 3,772,693 A | 11/1973 | Allard et al. | 343/6.5 LC |
| 3,772,697 A | 11/1973 | Ross | 343/13 R |
| 4,063,240 A * | 12/1977 | Isbister et al. | 342/21 |
| 4,216,538 A * | 8/1980 | Tomlinson et al. | 342/23 |
| 4,510,496 A | 4/1985 | Ross | |
| 4,893,127 A * | 1/1990 | Clark et al. | 342/386 |
| 5,274,378 A | 12/1993 | O'Conner | 342/23 |
| 5,351,055 A * | 9/1994 | Fujikawa et al. | 342/184 |
| 5,432,515 A | 7/1995 | O'Conner | 342/23 |
| 5,497,157 A * | 3/1996 | Gruener et al. | 342/36 |
| 5,534,872 A * | 7/1996 | Kita | 342/146 |
| 5,719,567 A * | 2/1998 | Norris | 340/953 |
| 5,754,429 A * | 5/1998 | Ishihara et al. | 340/958 |
| 5,872,547 A * | 2/1999 | Martek | 342/375 |
| 5,995,070 A * | 11/1999 | Kitada | 345/83 |
| 6,181,302 B1 * | 1/2001 | Lynde | 345/7 |
| 6,249,241 B1 * | 6/2001 | Jordan et al. | 342/41 |

FOREIGN PATENT DOCUMENTS

WO    WO 01/25724    4/2001

OTHER PUBLICATIONS

PCT Search Report; PCT/US02/33475; PCT/ISA/220 and PCT/ISA/210.

* cited by examiner

Primary Examiner—Thomas H. Tarcza
Assistant Examiner—Isam Alsomiri
(74) Attorney, Agent, or Firm—Daly, Crowley & Mofford, LLP

(57) ABSTRACT

A docking information system disposed on a ship provides navigational information to the operator of the ship. The system includes a short range radar system and a display to provide a range between the ship and a dock or an obstacle and, optionally, a relative velocity between the ship and the dock or the obstacle.

18 Claims, 2 Drawing Sheets

DOCKING INFORMATION SYSTEM FOR BOATS

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to vessel navigation systems and more particularly to a marine navigational system for vessels that provides information including a range between the vessels and a dock or an obstacle.

BACKGROUND OF THE INVENTION

As is known in the art, conventional vessels can have a primary propulsion system of two types. First, one or two propellers can be angularly fixed in a position parallel with the keel of the vessel and a rudder can be associated with each of the propellers. Alternatively, one or two propellers may be angularly movable with regard to the keel of the vessel and there may be no rudders. The term 'secondary propulsion system' is used herein to describe any other propulsion system on the vessel. Secondary propulsion systems are known to one of ordinary skill in the art to provide manual control of thrust at angles to the keel of the vessel for tight maneuvers. For example, bow and stem thrusters are known in the art.

As is also known, a vessel may have various forms of marine navigational equipment. Exemplary marine navigational systems include global positioning systems (GPS), magnetic compasses, gyro-compasses, marine radar systems, wind speed indicator systems, water current sensor systems, and marine speed logs.

Marine radar systems typically include an antenna mounted high on the vessel to allow the radar system to detect objects at the greatest possible range from the vessel. As is known in the art, a conventional marine radar system emits a pulsed beam of radar energy from the radar antenna and receives echoes by the radar antenna as the radar energy reflects off of objects in the path of the radar beam. The time delay between the transmitted pulse and the returned echo is used by the radar system to predict a distance from the vessel to the reflecting object. Typically, the radar beam is mechanically turned or "swept" in the azimuthal direction and the azimuthal steering of the beam is used to predict the azimuthal angle to the object. The conventional radar beam is swept azimuthally by mechanically rotating the radar antenna.

The beam width of a conventional marine radar is relatively narrow in azimuth, approximately 5 degrees, and relatively wide in elevation, approximately twenty five degrees, so as to form a vertically oriented fan shape. As with any projected energy, the fan shaped beam spreads spherically from the antenna, causing the fan shaped beam to have an outer 'front' edge that is curved as if to lie on a sphere that has the radar antenna at its origin.

The fan shaped azimuthally rotated beam provides sufficient range prediction accuracy for objects that are relatively far from the radar antenna. Due in part to the curved wavefront of the fan shaped beam, the conventional marine radar system range prediction accuracy is greatest at long ranges and degrades at close-in distances. Essentially, for relatively short ranges, the conventional marine radar cannot distinguish range difference between a farther tall object and a nearer short object. Both the farther tall object and the short nearer object can produce echoes with the same time delay. Thus, the conventional radar beam is not well suited for close-in docking operations. Conventional marine radars have a minimum display range that is typically hundreds of feet and display resolutions of tens of feet. For vessel docking, range accuracies and resolutions of less than plus or minus 1 foot would be desirable at vessel to dock ranges within 25 feet.

It is well known in the art that docking error can result in damage to the vessel and/or to the dock. As conditions become increasingly windy or where the water current is high, the likelihood of damage is greatest. The docking maneuver requires complex manual fore and aft thrust from the primary propulsion system or complex thrust control of the secondary propulsion system.

It would, therefore, be desirable to provide a system that provides accurate range data to the operator of a vessel when the vessel is in close proximity (e.g. 25 feet or less) to an obstacle, dock, or docking structure. It would be further desirable to provide a system that directly conveys to the operator of the vessel accurate relative velocity data corresponding to relative velocity between the vessel and an obstacle, dock, or docking structures.

SUMMARY OF THE INVENTION

In accordance with the present invention, a system for conveying navigational information to a vessel operator includes one or more radar systems coupled to a display processor for providing navigational information to the display processor, and a display coupled to the display processor for providing the navigational information to the vessel operator. The radar systems provide electronically steered conical beams to provide high accuracy measurements at close proximity to the vessel. The navigational information can include vessel to dock and vessel to obstacle range and relative velocity.

With this particular arrangement, the docking information system for boats of the present invention provides accurate close-in range and relative velocity information, corresponding to obstacles or a dock, to the operator of a vessel. With these characteristics, the docking information system for boats of the present invention. allows the vessel operator to both avoid obstacles and accurately dock the vessel. The likelihood of close-in obstacle collision is minimized. Similarly, the likelihood of manual docking error and resulting damage are minimized.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the docking information system for boats, some introductory concepts and terminology are explained. As used herein, the term "'ship'" is intended to pertain to any size of water born vessel. The term can apply to both power and sailing vessels. The term "dock" is intended to describe any structure at which a ship may come to a stop. The term "obstacle" is intended to describe any other object, not including a dock, with which the boat could come into contact, for example, objects free-floating in the water such as debris and swimmers, or an object floating in the water yet tethered to the bottom of the water body such as a buoy.

Figure 1:
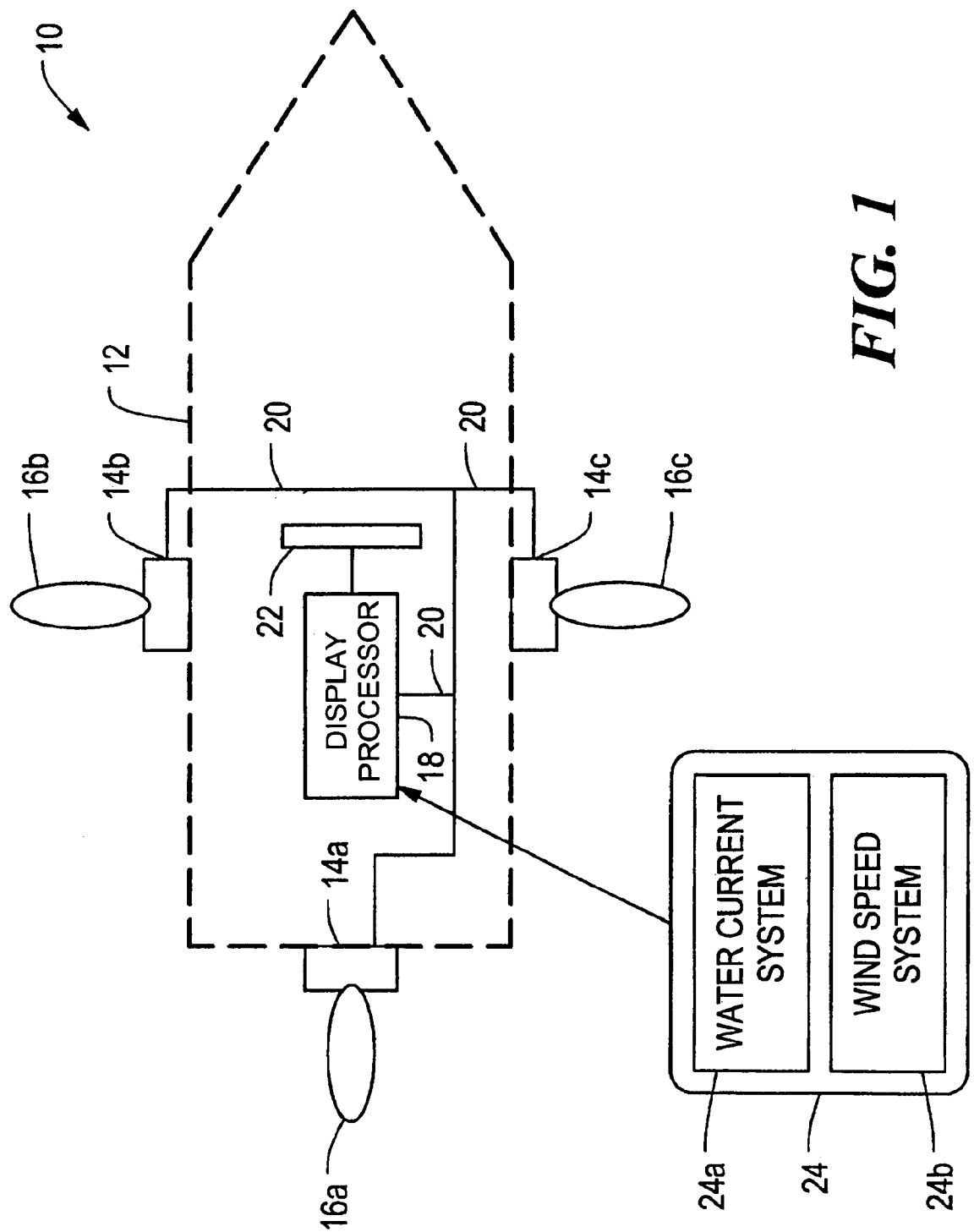
FIG. 1 is a block diagram of a vessel having a docking information system for boats disposed thereon.

Referring now to FIG. 1, a system 10 for providing a docking information is here shown on a ship 12. This ship 12 is shown in phantom since it is not properly a part of the system 10. The system 10 includes a plurality of short range radar systems 14a–14c, coupled to the ship 12. The short range radar systems 14a–14c emit continuous wave (CW) radar energy.

The transmitted CW radar energy is repetitively swept in frequency from a minimum CW frequency to a maximum CW frequency and vice versa, thus providing an FMCW signal, and the return echo is simultaneously received. At any frequency, the time difference between the transmitted signal and the received signal of an echo represents the range between the radar antenna and the echoing object. Velocity information can also be obtained by extracting the Doppler shift from the frequency differences between the up sweep and down sweep. Thus, the short range radar systems 14a–14c can provide both range and velocity information.

The short range radar systems 14a–14c may be of a type, for example, described in U.S. patent application entitled Radar Transmitter Circuitry and Techniques, filed on Aug. 16, 2001, and assigned application Ser. No. 09/931,636, and U.S. patent application entitled Highly Integrated Single Substrate MMW Multi-Beam Sensor, filed on Aug. 16, 2001, and assigned application Ser. No. 09/931,277, each of which are assigned to the assignee of the present invention and incorporated herein by reference. It should be appreciated of course that other radar systems can be used in accordance with the present invention.

It will be recognized by one of ordinary skill in the art, that conventional pulsed radar systems discussed above can also be used with this invention. However, unlike the conventional marine radar system that has a radar antenna mounted high on the ship as described above, the radar antenna of this invention must be mounted low enough so as to transmit radar energy to and receive an echo from a dock. Also, the conventional pulsed energy marine radar system gives an indication only of range data and directly provides no velocity data. It will, however, be recognized by one of ordinary skill in the art that velocity data may be derived from successive range data, which is a slower process.

It will be further recognized by one of ordinary skill in the art that a conventional pulsed radar has limitations in the minimum range at which it can be used. In particular, a conventional pulsed radar in a short range application may not meet the FCC bandwidth requirements specified to be no greater than 200 MHz at a power level of 6 $dB_{eirp}$. In order to operate at the short ranges required of the short range radar systems 14a–14c, a pulsed radar would require a very short radar pulse. Not only is such a short pulse technically difficult to achieve, but also, as the pulse width becomes narrower, the bandwidth of the transmitted signal becomes wider. A pulsed radar with pulse widths sufficiently short to enable operation at a minimum range required of the short range radar systems 14a–14c, on the order of one foot minimum range, fundamentally requires a frequency bandwidth in excess of 200 MHz.

In contrast, illustrative short range radar systems 14a–14c can generate an FMCW transmit signal having a frequency which increases from approximately 24.000 GHz to 24.200 GHz in approximately 1 ms, having a bandwidth of 200 MHz.

As is known to one of ordinary skill in the art, as radar energy radiates outward from an antenna, it spherically spreads, thus reducing in energy per area as it propagates. Whereas the short range radar systems 14a–14c only needs to operate over short ranges, for example a range of about zero to about one hundred feet maximum, the spherical spreading energy loss is far less than that of a conventional marine radar that typically transmits to receive echoes from objects many miles away from the antenna. Thus, the short range radar systems 14a–14c of this invention can operate at far lower output power levels than a convention marine radar system An illustrative CW output power level of six decibels (6 dB) effective isotropic radiated power (6 $dB_{eirp}$) is appropriate for the docking information system of the present invention. The illustrative short range radar system output power, generated with less than one Watt, can be compared to a conventional marine output power, generated with more than one thousand Watts.

In one illustrative embodiment, the short range radar systems 14a–14c are attached to the hull of the ship 12 approximately three feet above the water line. The height of the placement of the short range radar systems 14a–14c is determined by a number of factors, including but not limited to the height of a dock that is to be detected by the docking information system 10. The short range radar systems 14a–14c can be mounted to other structures associated with the ship 12 other than the hull that provide an attachment at the desired height.

Each of the short range radar systems 14a–14c produce a conically shaped transmit and receive beam designated 16a–16c which may be electronically scanned via the respective one of the short range radar systems 14a–14c. An exemplary short range radar system 14a–14c has transmit and receive beams with beamwidths of approximately fifteen degrees and a scan range in azimuth of approximately one hundred fifty degrees. It will be recognized by one of ordinary skill in the art that other beam patterns, beam widths, and scan ranges are possible with this invention.

Each of the short range radar systems 14a–14c are coupled to an display processor 18 via signal paths 20. The short range radar systems 14a–14c provide both range data and velocity data to the display processor 18, where velocity data is the rate of closure between the dock and the ship. In one embodiment, the signal paths 20 have transmitted therein a stream of digital bits that represent range data and velocity data. In a preferred embodiment, the short range radar systems 14a–14c provide range information that is accurate to less than plus or minus one foot and velocity data that is accurate to less than plus or minus 0.2 knots as the ship nears the dock. In an alternate embodiment, it will be recognized by one of ordinary skill in the art that the short range radar systems 14a–14c can provide only the range data, wherein the display processor 18 can compute the velocity data.

The display processor 18 receives input range data and velocity data from the short range radar systems 14a–14c. The display processor 18 can also receive data from conventional marine navigational systems 24a, 24b generally denoted 24. Marine navigational system 24a corresponds to a conventional water current indication system and marine navigational system 24b corresponds to a conventional wind speed indication system. Those of ordinary skill in the art should appreciate, however, that other types of marine navigational systems may also be used. The display processor 18 receives data from each of the radars 14a–14c and some or all of the navigational systems 24 and computes ship position relative to the dock, and ship velocity relative to the dock, and provides data to a display 22. Any marine navigation system can be used to augment the display 22. For example, a marine speed log may be used to augment the display 22. Optionally, the short range radar systems 14a–14c can provide the only data.

By observing the radar data presented on the display 22, the ship operator is able to avoid obstacles, or perform a safe docking of the ship 12 at a controlled approach rate to the dock.

It should be recognized that although the exemplary docking information system 10 is shown with three short range radar systems 14a–14c, other numbers of short range radar systems are possible. The particular number of short range radar systems 14 to use in any particular application is selected in accordance with a variety of factors including but not limited to the length and the size of the ship. Likewise, the position of each of the short range radar systems 14a–14c on a ship is selected in accordance with a variety of factors including but not limited to the length and the size of the ship, and the height of the dock or the obstacles to be detected by the docking information system 10.

Since the number and position of the short range radar systems 14a–14c is determined by factors above, the docking information system 10 may require calibration so that the accurate position of the ship 12 relative to the dock will be provided to the display 22 and to the display processor 18, thus allowing the display processor 18 to effect a safe docking of the ship 12.

Figure 2:
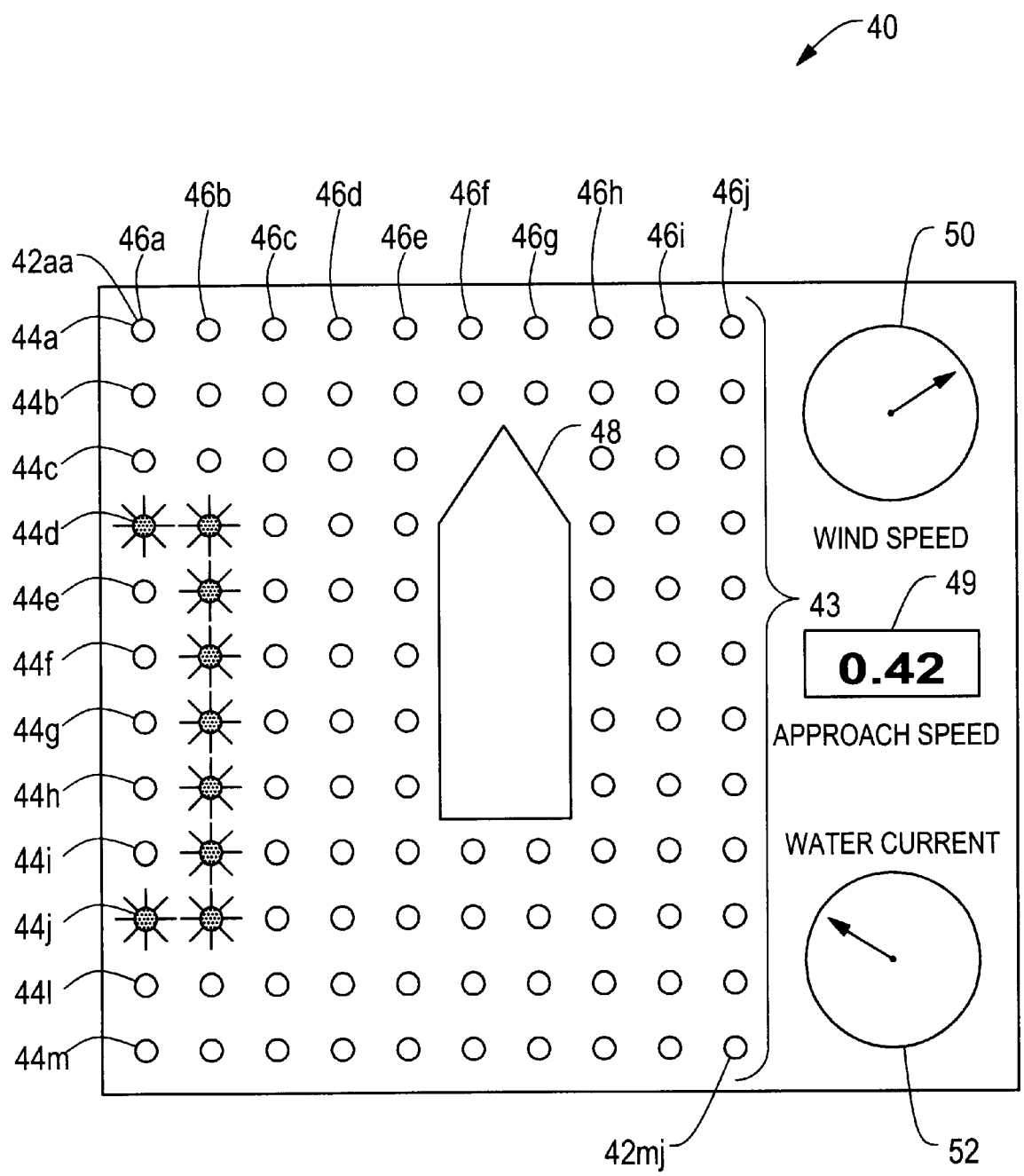
FIG. 2 is a diagram of a display for a docking information system for boats.

Referring now to FIG. 2, a display 40, corresponding to display 22 (FIG. 1), includes a plurality of LED's 42 arranged in a grid pattern 43. Here the grid pattern 43 comprises twelve rows 44a–44m and ten columns 46a–46j. Each particular LED 42 is designated as 42xy where "x" corresponds to a row and "y" corresponds to a column. For example, LED 42aa corresponds to the LED disposed at the intersection of row 44a and column 46a while LED 42mj corresponds to the LED disposed at the intersection of row 44m and column 46j.

Disposed within the LED grid pattern 43 is an icon 48 which represents a ship, related to which the docking and obstacle information is displayed The icon 48 may or may not be provided having a shape which is similar to the shape of the actual ship on which the system is disposed.

The display processor 18 (FIG. 1) causes certain ones of the LEDs 42 to light to indicate the relative position between a dock and to ship. As shown in FIG. 2, for example, LEDs 42da, 42db, 42eb, 42fb, 42gb, 42hb, 42ib, 42jb and 42ja are lit to indicate the position of a dock relative to a position of a ship indicated by icon 48. As the distance between the actual ship and the actual dock decreases, LEDs 42eb, 42fb, 42gb, 42hb, and 42ib turn off and LEDs 42dc, 42ec, 42fc, 42gc, 42hc, 42ic and 42jc turn on thus providing a visual indication that the distance between the ship and the dock has decreased. This process is repeated until the LEDs in column 46e adjacent icon 48 are illuminated. It will be understood that in the case where the dock is on the opposite side of the vessel from that shown in FIG. 1, the process is repeated until the LEDs in column 46h are illuminated.

While a dock is shown in the figure, it is understood that the display may also present a view of obstacles.

In an alternate embodiment, an icon can be used to represent the dock and a light pattern representing a ship can be illuminated. Thus, by illuminating different ones of the LED's 4d, the ship can appear to move closer to the dock icon.

The display 40 also includes an approach speed indicator 49 that represents the velocity data corresponding to the velocity of the ship relative to the dock provided by the short range radar systems 14a–14c, a wind speed indicator 50 and a water current indicator 52, corresponding to data provided by the wind speed indication system 24b (FIG. 1) and the water current indication system 24a (FIG. 1) respectively. It will be recognized by one of ordinary skill in the art that other forms of display are possible with this device, including, for example, CRT displays, liquid crystal displays (LCD), and chart displays. It will further be recognized that other marine navigational data may be displayed, for example, GPS information from a GPS system, Loran information from a Loran system, or ship speed information from a marine speed log. It should also be understood that in addition to or in place of a visual display, the system can also provide an audio display or even a mechanical indication of proximity of a ship to a dock.

In an alternate embodiment, a video display can be provided in place of the display 40 and having the grid pattern 43, the icon 48, the approach speed indicator 49, the wind speed indicator 50, and the water current indicator 52.

The docking information system of the present invention provides a display of close-in range and relative velocity between the ship and the dock or the ship and obstacles that allows the ship operator to either avoid the obstacles or to more accurately and safely dock the ship. The docking information system for boats utilizes conically shaped radar beams, narrow in two dimensions, that are electronically steered. The conical beams provide accurate close-in radar range and relative velocity data. With these characteristics, the docking information system for boats of the present invention can provide information to help the ship operator to avoid obstacles or to manually dock a ship in difficult conditions, with wind and water current. The likelihood of docking error and resulting damage are minimized.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A system for providing navigational information to an operator of a ship comprising:

a plurality of radar systems, each coupled to the ship;

a display processor coupled to each one of said plurality of radar systems, said display processor for receiving radar information from each one of said plurality of radar systems, and for providing navigational information; and a display coupled to the display processor, wherein the display includes a fixed visual indication of the ship, having a fixed position, a fixed size, and a fixed shape for any ship, and wherein the display also includes a moveable visual indication of a dock or an obstacle at a range relative to the visual indication of the ship.

2. The system of claim 1, wherein the navigational information further comprises:

relative velocity between the ship and the dock or the obstacle.

3. The system of claim 1, wherein each one of the plurality of radar systems comprise:

an antenna system having one or more electrically steered antenna beams.

4. The system of claim 3, wherein each of the antenna beams is provided having a generally conical shape.

5. The system of claim 4, wherein the display processor is further coupled to one or more marine navigation systems.

6. The system of claim 1, wherein the display further comprises:

a visual indication of the range between the ship and the dock.

7. The system of claim 1, wherein the display further comprises:

a visual indication of the relative velocity between the ship and the dock.

8. The system of claim 1, wherein the display further comprises:

a visual indication of navigational information from the one or more marine navigational systems.

9. The system of claim 1, wherein the display further comprises:

a visual indication of the obstacle; and a visual indication of a relative position of the ship with respect to the obstacle.

10. The system of claim 9, wherein the display further comprises:

a visual indication of the range between the ship and the obstacle.

11. The system of claim 9, wherein the display further comprises:

a visual indication of the relative velocity between the ship and the obstacle.

12. The system of claim 9, wherein the display further comprises:

a visual indication of navigational information from the one or more marine navigational systems.

13. The system of claim 1, wherein the display range has a range limitation.

14. The system of claim 1, wherein the display includes light emitting diodes that provide the moveable visual image of the dock or the obstacle.

15. The system of claim 1, wherein each one of the plurality of radar systems comprises an FMCW radar system.

16. The system of claim 1, wherein the range is one hundred feet or less.

17. The system of claim 1, wherein at least one of said plurality of radar systems is adapted to provide range information having an accuracy of less than plus or minus one foot.

18. The system of claim 1, wherein at least one of said plurality of radar systems is adapted to provide velocity information having an accuracy or less than plus or minus 0.2 knots.

* * * * *

UNITED STATES PATENT AND TRADEMARK OFFICE
CERTIFICATE OF CORRECTION

PATENT NO. : 6,707,414 B2
DATED : March 16, 2004
INVENTOR(S) : H. Barteld Van Rees et al.

It is certified that error appears in the above-identified patent and that said Letters Patent is hereby corrected as shown below:

Column 1,
Line 32, delete "stem" and replace with -- stern --.

Column 2,
Line 48, delete "invention." and replace with -- invention, --.

Column 3,
Lien 1, delete " "'ship'" " and replace with -- "ship" --
Line 38, delete "of course" and replace with -- , of course, --.

Column 4,
Line 10, delete ", for example a" and replace with -- , for example, a --.
Line 30, delete "to the" and replace with -- to, the --.

Column 5,
Line 22, delete "including" and replace with -- , including --.
Line 23, delete "to the" and replace with -- to, the --.
Line 26, delete "including but not limited to" and replace with -- , including but not limited to, --.

Signed and Sealed this

Tenth Day of August, 2004

JON W. DUDAS
*Acting Director of the United States Patent and Trademark Office*